Patented Jan. 12, 1943

2,308,192

UNITED STATES PATENT OFFICE 2,308,192

UNSATURATED ALCOHOLS AND PROCESS FOR THE MANUFACTURE THEREOF

Louis A. Mikeska, Westfield, and Erving Arundale, Union, N. J., assignors to Standard Oil Development Company, a corporation of Delaware No Drawing. Application October 31, 1939, Serial No. 302,122

22 Claims. (Cl. 260—632)

The present invention relates to a process for the production of unsaturated monohydric primary alcohols from tertiary olefins or mixtures of such olefins with saturated hydrocarbons by condensing the tertiary olefins with formaldehyde in the presence of an anhydrous metal halide catalyst or a metal salt of a halogenated organic acid.

Heretofore, low molecular weight unsaturated alcohols have been produced synthetically by various methods, the most important of which are the partial dehydration of dihydric alcohols containing a secondary or tertiary hydroxyl group, the hydrolysis of unsaturated halides, the action of oxalic or formic acids on glycerol, the reduction of the aldehyde group of the corresponding unsaturated aldehydes, the action of aldehydes or ketones on Grignard reagents of unsaturated halides, the reduction of the acetylenic linkage of acetylenic alcohols, and the isomerization of alkylene oxides.

According to the present invention, unsaturated primary alcohols are obtained by the condensation of tertiary olefins with formaldehyde in the presence of an inorganic metal halide catalyst, or a metal salt of a halogenated organic acid, which catalyst may be dissolved in a non-aqueous inert solvent.

The term "tertiary olefins" mentioned herein includes all olefins containing 4–16 carbon atoms and possessing the general formula—

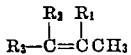

wherein $R_1$ is an aliphatic, cycloaliphatic, araliphatic, alkaryl, or aromatic hydrocarbon radical, and $R_2$ and $R_3$ are aliphatic, cycloaliphatic, araliphatic, alkaryl, or aromatic hydrocarbon radicals or hydrogen atoms. Other unsaturated tertiary compounds, i. e., compounds containing a tertiary carbon atom adjoining the olefinic linkage which carbon atom is attached to a methyl group, such as unsaturated alcohols, unsaturated ethers, and the like, also undergo similar reactions with formaldehyde.

The condensations are catalyzed by inorganic metallic halides and metal salts of halogenated organic acids formed by the action of mineral or organic halogen-containing acids on elements of the second or fourth groups of the periodic table. Such catalysts include zinc chloride, stannic chloride, silicon tetrachloride, zinc dichloracetate, and the like. The catalyst employed should be of 95% purity or better, although the anhydrous salt is to be preferred. The above catalysts do not polymerize the olefin being used under the reaction conditions employed. Ethers, chlorinated hydrocarbons, volatile saturated hydrocarbons, etc. may be used as solvents for the catalyst but such solvents must be inert and indifferent to both the reactants and the catalyst.

The unsaturated primary alcohols prepared by this process are novel and have the general formula—

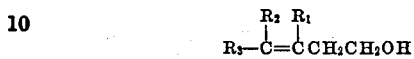

where $R_1$, $R_2$ and $R_3$ have the same significance as above. The simplest compound which can be made according to this method is isopropenyl ethyl alcohol (isobutenyl carbinol), obtained by the reaction of isobutylene and formaldehyde, as follows:

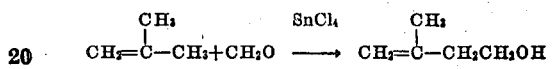

Unsaturated formals are obtained as byproducts in these reactions. These formals are formed by the reaction of the unsaturated alcohols with additional formaldehyde; however, they can be converted to the unsaturated alcohols by hydrolysis.

The reactions proceed readily at room temperature but may also be carried out at temperatures below or slightly above room temperature. Elevated temperatures are to be avoided because under such conditions polymerization and by-product formation become major reactions. In order to prevent the formation of metadioxanes in these condensations, the reaction mixtures should be anhydrous and the catalyst should be non-acidic under the conditions employed.

Gaseous formaldehyde, para-formaldehyde, trioxymethylene, isomers of trioxymethylene, or any other compound which decomposes to yield formaldehyde under the reaction conditions may be used as the source of formaldehyde in these reactions. When the olefins used are liquids at room temperature, the reaction may be carried out in any closed vessel equipped with means for securing intimate contact between the reactants and the catalyst. However, when the olefin is a vapor or highly volatile liquid at ordinary temperatures and pressures, a bomb capable of retaining the vapors and providing efficient contact between the reactants and the catalyst by agitation must be used.

The tertiary olefins and formaldehyde condense in approximately equimolecular proportions so that the olefin-formaldehyde molar ratio should be at least 1 to 1 for best results. The amount of catalyst used depends on the nature of the catalyst, but usually ranges from 0.01 to 0.02 mol of catalyst per mol of formaldehyde. Larger amounts may be used if desired.

Chlorinated hydrocarbons appear to be the best solvents for the reaction mixture and, of these chlorinated solvents, chloroform is to be preferred. Diethyl ether has been found to be a good solvent when using zinc salts as catalysts.

The reaction is carried out by contacting the mixture of olefin, trioxymethylene (or other source of formaldehyde), solvent, and catalyst until no more formaldehyde will react. The reaction mixture is then filtered to remove any unreacted trioxymethylene (when this is the source of formaldehyde), which may be recycled, and the filtrate is neutralized with dilute alkali solution. The product is then isolated by extraction or steam distillation of the neutralized filtrate and subsequent fractionation of the crude material. The reaction may also be carried out in a continuous fashion.

The crude product is obtained as a constant boiling mixture of unsaturated alcohol and meta-dioxane, in which the unsaturated alcohol is in preponderance.

When isobutylene is condensed with formaldehyde in the presence of stannic chloride as the catalyst, the resulting product is a constant boiling mixture of isopropenyl ethyl alcohol and 4,4-dimethyl meta-dioxane. This constant boiling mixture has the following properties:

| | |
|---|---|
| Boiling point °C | 129.5 |
| Density at 20° C | 0.870 |
| Refractive index at 20° C | 1.4332 |
| Isopropenyl ethyl alcohol per cent | 84–86 |
| 4,4-dimethyl meta-dioxane per cent | 16–14 |

The meta-dioxane may be removed from the mixture by careful water-washing. The pure isopropenyl ethyl alcohol has the following structure and physical properties:

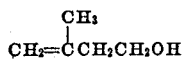

| | |
|---|---|
| Molecular weight | 86.13 |
| Boiling point of alcohol °C @ 768 mm | 130.2 |
| Boiling point of acetate °C | 143–144 |
| Boiling point of formal °C | 213 |
| Density of alcohol at 20° C | 0.853 |
| Refractive index of alcohol at 20° C | 1.4347 |
| Melting point of phenyl urethane °C | 33 |

The unsaturated alcohols prepared in this manner have many important uses. They may be employed as blending agents for motor fuels or as solvents for lacquers, perfumes, and the like. They may be esterified with saturated acids and the resulting esters may be used as solvents or be sulfated or sulfonated to produce wetting agents. They can be converted to halides or ethers, or nitrated for the production of Diesel fuel ignition promoters. They may also be halogenated, oxidized, hydrogenated, reduced, dehydrogenated, or dehydrated, the latter operation producing conjugated diolefins.

The following examples are given for the purpose of illustrating the invention:

Example 1

240 parts of trioxymethylene, 900 parts of chloroform, 490 parts of isobutylene, and 67 parts of fuming stannic chloride (all parts by weight) were placed in a bomb and the bomb was then shaken at room temperature for 7½ hours. At the end of this time, the trioxymethylene had disappeared and a water-clear, homogeneous mixture was present. The excess olefin was then bled off (it could be recycled if desired). 426 parts of isobutylene had been absorbed. The product was neutralized by shaking with a dilute solution of potassium carbonate and the neutral solution was steam distilled. The distillate contained two layers, the lower of which was a mixture of chloroform and the desired unsaturated alcohol. The lower layer was separated, dried, and then fractionated. The recovered chloroform may be recycled. 212 parts of isopropenyl ethyl alcohol-4,4-dimethyl meta-dioxane mixture were obtained, boiling at 125–130° C. (the majority of this fraction boiled at 129–130° C.). This product had a bromine number of 167 cg. Br₂/gm. (theoretical bromine number=185), and was approximately 90% pure isopropenyl ethyl alcohol. This constant boiling mixture is carefully water-washed to obtain the unsaturated alcohol boiling at 130° C. 66 parts of isopropenyl ethyl formal, boiling at 207–216° C., were also obtained.

Example 2

240 parts of trioxymethylene, 140 parts of 95% zinc chloride, 290 parts of ethyl ether, and 500 parts of isobutylene were placed in a bomb and the bomb was shaken at room temperature for 46 hours. The excess isobutylene was then bled off and it was found that 297 parts of olefin had been absorbed. The product was filtered and 56 grams of trioxymethylene were recovered. The filtrate was neutralized with ammonia and the ether layer was separated, washed with water, and then dried and fractionated. The recovered ether may be recycled. 167 parts of isopropenyl ethyl alcohol were obtained, boiling at 126–130° C., and having a bromine number of 131 cg. Br₂/gm.

Example 3

240 parts of trioxymethylene, 56 parts of zinc dichloracetate, 140 parts of ethyl ether, and 480 parts of isobutylene were placed in a bomb and the bomb was shaken at room temperature for 46 hours. The excess olefin was then bled off and it was found that 135 parts had been absorbed. The mixture was filtered and 121 parts of trioxymethylene were recovered. The filtrate was neutralized with ammonia and the ether layer was separated, water-washed, dried, and fractionated. 84 parts of isopropenyl ethyl alcohol, boiling at 128–130° C., and having a bromine number of 156 cg. Br₂/gm., were obtained. The use of a larger amount of catalyst improves the trioxymethylene conversion.

Example 4

120 parts of trioxymethylene, 300 parts of chloroform, 285 parts of trimethyl ethylene, and 33 parts of fuming stannic chloride were placed in a bomb and the bomb was shaken at room temperature for 21 hours. The majority of the trioxymethylene reacted within the first seven hours. The water-clear, homogeneous product was neutralized with dilute carbonate solution, and the neutral mixture was steam distilled. The two layers in the distillate were separated, and the lower chloroform-product layer was dried and then fractionated. 89 parts of 3-methyl-pentene-3-ol-1, boiling at 135–145° C., were obtained, along with 36 parts of the corresponding formal, which boiled at 227–230° C.

Example 5

126 parts of 2-methyl pentene-2, 45 parts of trioxymethylene, 165 parts of chloroform, and 12 parts of fuming stannic chloride were placed in a vessel equipped with a stirrer and the mixture was stirred at room temperature for 19 hours. The trioxymethylene reacted completely. The product was isolated as in Example 4. 35 parts of 3-methylhexene-3-ol-1, boiling at 153-163° C., were obtained.

*Example 6*

900 parts of diisobutylene, 900 parts of chloroform, 240 parts of trioxymethylene, and 67 parts of fuming stannic chloride were placed in a closed vessel equipped with a stirrer, and the mixture was contacted at room temperature for 20 hours. A slight temperature rise was noticed at the outset. The majority of the trioxymethylene disappeared within the first four hours. The water-clear product was neutralized with dilute carbonate solution, and the neutral solution was steam distilled to remove chloroform and excess diisobutylene. The steam distillation residue consisted of two layers. The upper product layer was dried and then vacuum distilled. 260 parts of a $C_9H_{18}O$ unsaturated alcohol were obtained, boiling at 85–91° C. under 4 mm. pressure.

The above examples are given for illustrative purposes only and are not to be considered as limiting the invention.

We claim:

1. The method of producing an unsaturated, monohydric, primary alcohol of the type—

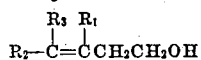

wherein $R_1$ is a radical selected from the group consisting of alkyl, cycloalkyl, aryl, aralkyl, and alkaryl; and $R_2$ and $R_3$ are substituents selected from the group consisting of hydrogen and aliphatic, cycloaliphatic, araliphatic, alkaryl and aromatic radicals, which comprises reacting a tertiary olefin, having from 4 to 16 carbon atoms, of the general type—

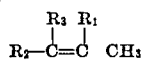

where $R_1$, $R_2$, and $R_3$ are the same as above, with formaldehyde in the presence of a catalyst chosen from the group consisting of stannic chloride, zinc chloride, silicon tetrachloride and zinc dichloracetate.

2. The method of producing an unsaturated, monohydric primary alcohol of the type—

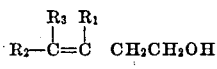

wherein $R_1$ is an alkyl radical and $R_2$ and $R_3$ are selected from the group consisting of hydrogen and aliphatic, cycloaliphatic, araliphatic, alkaryl and aromatic radicals, which comprises reacting an aliphatic tertiary olefin having from four to 16 atoms, of the general type—

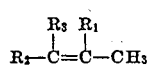

where $R_1$, $R_2$ and $R_3$ are the same as above, with formaldehyde in the presence of a catalyst chosen from the group consisting of stannic chloride, zinc chloride, silicon tetrachloride and zinc dichloracetate.

3. The method of producing an unsaturated, monohydric, primary alcohol comprising reacting an aliphatic tertiary olefin, having a methyl group attached to the tertiary carbon atom, of from 4 to 16 carbon atoms with formaldehyde in the presence of a catalyst chosen from the group consisting of stannic chloride, zinc chloride, silicon tetrachloride and zinc dichloracetate.

4. The method of producing an unsaturated, monohydric, primary alcohol comprising reacting an aliphatic tertiary olefin, of from 4 to 16 carbon atoms with formaldehyde in the presence of anhydrous stannic chloride dissolved in an inert solvent, diluting the reaction mixture with water, neutralizing the diluted mixture with alkali, and recovering the unsaturated primary alcohol.

5. The method of producing an unsaturated, monohydric, primary alcohol comprising condensing an aliphatic tertiary olefin of from 4 to 16 carbon atoms with formaldehyde in the presence of fuming stannic chloride dissolved in an inert solvent, diluting the reaction mixture with water, neutralizing the diluted mixture with an alkali metal carbonate, and recovering the unsaturated primary alcohol by distillation.

6. The method of producing isopropenyl ethyl alcohol comprising condensing isobutylene with formaldehyde in the presence of fuming stannic chloride dissolved in an inert solvent, diluting the reaction mixture with water, neutralizing the diluted mixture with an alkali metal carbonate, and recovering the unsaturated primary alcohol from the neutralized mixture.

7. The method of producing an unsaturated, monohydric, primary alcohol comprising reacting an aliphatic tertiary olefin of from 4 to 16 carbon atoms with formaldehyde in the presence of a catalyst chosen from the group consisting of stannic chloride, zinc chloride, silicon tetrachloride, zinc dichloracetate, dissolved in chloroform, and recovering the unsaturated primary alcohol.

8. The method of making isopropenyl ethyl alcohol which comprises condensing equimolecular proportions of isobutylene and formaldehyde in the presence of fuming stannic chloride dissolved in chloroform, diluting the reaction mixture with water and neutralizing it with sodium carbonate solution, steam distilling the neutralized reaction mixture to obtain a condensed distillate consisting of an upper layer of water and a lower layer of chloroform and unsaturated alcohol, separating the lower layer, drying it, and fractionating the dried material to obtain the desired unsaturated alcohol.

9. The method of producing an unsaturated, monohydric, primary alcohol comprising reacting an aliphatic tertiary olefin of from 4 to 16 carbon atoms with formaldehyde in the presence of anhydrous zinc chloride of from 95–100% purity dissolved in an inert solvent, and recovering the unsaturated primary alcohol.

10. The method of producing an unsaturated, monohydric, primary alcohol comprising reacting an aliphatic tertiary olefin, of from 4 to 16 carbon atoms, with formaldehyde in the presence of anhydrous zinc dichloracetate dissolved in an inert solvent, and recovering the unsaturated primary alcohol.

11. The method of producing an unsaturated, monohydric, primary alcohol comprising condensing an aliphatic tertiary olefin of from 4 to 16 carbon atoms with formaldehyde in the presence of anhydrous zinc chloride of from 95–100% purity dissolved in diethyl ether, and diluting the reaction mixture with water, neutralizing the diluted mixture with an alkali metal carbonate, and recovering the unsaturated primary alcohol by distillation.

12. The method of producing an unsaturated, monohydric, primary alcohol comprising reacting an aliphatic tertiary olefin, of from 4 to 12 carbon atoms, with formaldehyde in the presence of anhydrous zinc dichloracetate dissolved in diethyl ether, diluting the reaction mixture with water, neutralizing the diluted mixture with alkali, and recovering the unsaturated primary alcohol.

13. A method of producing 2-methyl-butene-1-ol-4 comprising reacting isobutylene with formaldehyde in the presence of a catalyst selected from the group consisting of stannic chloride, zinc chloride, silicon tetra chloride, zinc dichloracetate, dissolved in an inert solvent and recovering the 2-methyl-butene-1-ol-4.

14. A method of producing 3-methyl-hexene-3-ol-1 comprising reacting 2 methyl pentene 2 with formaldehyde in the presence of a catalyst selected from the group consisting of stannic chloride, zinc chloride, silicon tetra chloride and zinc dichloracetate, dissolved in an inert solvent and recovering the 3-methyl-hexene-3-ol-1.

15. A method of producing isopropenyl ethyl alcohol comprising reacting isobutylene with formaldehyde in the presence of zinc chloride dissolved in diethyl ether and recovering the isopropenyl ethyl alcohol.

16. A method of producing isopropenyl ethyl alcohol comprising reacting isobutylene with formaldehyde in the presence of anhydrous zinc dichloracetate dissolved in diethyl ether and recovering the isopropenyl ethyl alcohol.

17. The method of making an unsaturated, monohydric, primary alcohol which comprises condensing equimolecular proportions of diisobutylene and formaldehyde in the presence of a catalyst selected from the group consisting of stannic chloride, zinc chloride, silicon tetra chloride and zinc dichloracetate, dissolved in chloroform, diluting the reaction mixture with water, neutralizing with sodium carbonate solution, steam distilling the neutralized reaction mixture to obtain a condensed distillate consisting of an upper layer of water and a lower layer of chloroform and unsaturated alcohol, separating the lower layer, drying it, and fractionating the dried material to obtain the desired unsaturated alcohol.

18. The method of producing an unsaturated, monohydric, primary alcohol comprising reacting diisobutylene with formaldehyde in the presence of fuming stannic chloride dissolved in an inert solvent, and recovering the unsaturated primary alcohol.

19. The method of producing 3-methyl-hexene-3-ol-1 which comprises reacting 2-methyl-pentene-2 and formaldehyde in the presence of fuming stannic chloride dissolved in chloroform, and recovering the 3-methyl-hexene-3-ol-1.

20. As a composition of matter, an unsaturated, monohydric, primary alcohol of the type—

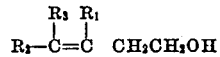

where $R_1$ is a radical selected from the group consisting of alkyl, cycloalkyl, aryl, aralkyl and alkaryl; and $R_2$ and $R_3$ are substitutents selected from the group consisting of hydrogen and aliphatic, cycloaliphatic, araliphatic, alkaryl and aromatic radicals.

21. As a composition of matter, 3-methyl-hexene-3-ol-1.

22. As a composition of matter, 2-methyl-butene-1-ol-4.

LOUIS A. MIKESKA.
ERVING ARUNDALE.